(12) United States Patent
Della Corte et al.

(10) Patent No.: US 10,496,518 B2
(45) Date of Patent: Dec. 3, 2019

(54) OBJECTIVE EVALUATION OF CODE BASED ON USAGE

(71) Applicant: International Business Machines Corporation, Armonk, NY (US)

(72) Inventors: Gianluca Della Corte, Rome (IT); Francesca Galeri, Fiumicino (IT); Leonida Gianfagna, Rome (IT); Antonio M. Sgro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/366,925

(22) Filed: Dec. 1, 2016

(65) Prior Publication Data

US 2018/0157577 A1  Jun. 7, 2018

(51) Int. Cl.
*G06F 11/36*  (2006.01)
*G06F 8/65*  (2018.01)
*G06F 8/70*  (2018.01)

(52) U.S. Cl.
CPC ............ *G06F 11/3612* (2013.01); *G06F 8/65* (2013.01); *G06F 8/70* (2013.01)

(58) Field of Classification Search
None
See application file for complete search history.

(56) References Cited

U.S. PATENT DOCUMENTS 7,546,295 B2 * 6/2009 Brave ................. G06F 16/9535
8,484,041 B2 7/2013 Yang
(Continued)

FOREIGN PATENT DOCUMENTS

JP  5917542 B2  5/2016

OTHER PUBLICATIONS

Abdel-Hafez, Et Al.: "Ontology-based Product's Reputation Model", in Raghave, Vijay, Hu, Xiaolin, Liau, Churn-Jung, & Treur, Jan (Eds.) Proceedings of the 2013 IEEE/WIC/ACM International Conferences on Web Intelligence (WI) and Intelligent Agent Technology (IAT), IEEE, Atlanta, Georgia, 2013, pp. 37-40.
(Continued)

*Primary Examiner* — Matthew J Brophy
(74) *Attorney, Agent, or Firm* — Patterson + Sheridan, LLP

(57) ABSTRACT

A method, associated system, and computer program product are disclosed for facilitating improved objectivity of feedback for evaluating software programs. The feedback is provided by a user. The method comprises, upon determining an authorization to monitor usage of a predefined program by the user, retrieving a predefined evaluation profile specifying one or more parameters for assessing usage of the program. The method further comprises accessing usage data associated with the user and the program, and calculating, based on the usage data and relative to the one or more parameters of the evaluation profile, a program usage score associated with the user and the program. The method further comprises transmitting the program usage level from the computing device to an external feedback evaluation system. The external feedback evaluation system is configured to associate the program usage level with the feedback provided by the user and related to the program.

20 Claims, 6 Drawing Sheets

(56) References Cited

U.S. PATENT DOCUMENTS

| | | | | |
|---|---|---|---|---|
| 8,566,391 | B2* | 10/2013 | Saito | G06F 21/105 709/203 |
| 8,954,951 | B1* | 2/2015 | Cohen | G06F 8/65 717/168 |
| 9,003,017 | B2* | 4/2015 | Gerber | G06F 11/302 709/224 |
| 9,477,283 | B2* | 10/2016 | Gerber | G06F 11/302 |
| 9,633,081 | B1* | 4/2017 | Procopio | H04L 67/22 |
| 2007/0282670 | A1 | 12/2007 | Repasi et al. | |
| 2009/0112704 | A1* | 4/2009 | Branca | G06Q 10/06 705/7.14 |
| 2010/0131517 | A1* | 5/2010 | Huang | G06F 16/951 707/752 |
| 2011/0270963 | A1* | 11/2011 | Saito | G06F 21/105 709/224 |
| 2012/0130863 | A1 | 5/2012 | Tedjamulia et al. | |
| 2012/0226627 | A1 | 9/2012 | Yang | |
| 2013/0007255 | A1* | 1/2013 | Gerber | G06F 11/302 709/224 |
| 2013/0074051 | A1* | 3/2013 | Freeman | G06F 11/3438 717/130 |
| 2013/0326028 | A1* | 12/2013 | Cox | G06F 9/4856 709/220 |
| 2013/0346917 | A1* | 12/2013 | Bragdon | G06F 11/3419 715/802 |
| 2014/0068562 | A1* | 3/2014 | Hamid | G06F 11/323 717/124 |
| 2014/0365397 | A1* | 12/2014 | Mitra | G06Q 30/0282 705/347 |
| 2015/0212563 | A1* | 7/2015 | Gerber | G06F 11/302 713/340 |
| 2016/0098334 | A1* | 4/2016 | Hariharakrishnan | G06F 11/3013 702/186 |
| 2016/0127511 | A1* | 5/2016 | Zhang | G06F 11/3068 709/203 |
| 2016/0358494 | A1* | 12/2016 | Bilic | G09B 7/00 |
| 2017/0060366 | A1* | 3/2017 | Alexander | G06F 11/3089 |
| 2017/0147467 | A1* | 5/2017 | Lin | G06F 11/3013 |
| 2017/0192872 | A1* | 7/2017 | Awad | G06F 17/18 |
| 2017/0235622 | A1* | 8/2017 | Boyapalle | G06F 11/3055 714/47.2 |
| 2017/0270437 | A1* | 9/2017 | Johnstone | G06F 11/34 |

OTHER PUBLICATIONS

Mohammad Allahbakhsh, Et Al.: "Robust Evaluation of Products and Reviewers in Social Rating Systems", SpringerLink article, Jan. 2015, vol. 18, Issue 1, pp. 73-109. http://link.springer.com/article/10.1007/s11280-013-0242-4.

* cited by examiner

| FORUM ID | FUNCTION | COMPOSITE SCORE |
|---|---|---|
| USER 1 | FUNCTION F1 | 0.450 |
| SUPERUSER | FUNCTION F1 | 0.765 |

FIG. 7

OBJECTIVE EVALUATION OF CODE BASED ON USAGE

BACKGROUND

Embodiments disclosed herein relate to the field of evaluation of code. More specifically, embodiments disclosed herein relate to producing an objective evaluation of software programs by associating feedback provided by a user with program usage data associated with the user.

SUMMARY

According to one embodiment, a computer-implemented method is disclosed for facilitating improved objectivity of feedback for evaluating software programs, the feedback provided by a user associated with a computing device at a first network location. The method comprises, upon determining an authorization to monitor usage of a predefined program by the user, retrieving, at the computing device, a predefined evaluation profile specifying one or more parameters for assessing usage of the program. The method further comprises accessing usage data associated with the user and the program, and calculating, based on the usage data and relative to the one or more parameters of the evaluation profile, a program usage level associated with the user and the program. The method further comprises transmitting the program usage level from the computing device to an external feedback evaluation system at a second network location, wherein the external feedback evaluation system is configured to associate the program usage level with the feedback provided by the user and related to the program.

According to another embodiment of the disclosure, a system is disclosed to facilitate improved objectivity of feedback for evaluating software programs, the feedback provided by a user. The system comprises a computing device at a first network location and associated with the user. The computing device comprises one or more computer processors and is configured to retrieve, upon determining an authorization to monitor the user's usage of a predefined program, a predefined evaluation profile specifying one or more parameters for assessing usage of the program. The computing device is further configured to access usage data associated with the user and the program, and to calculate, based on the usage data and relative to the one or more parameters of the evaluation profile, a program usage level associated with the user and the program. The computing device is further configured to transmit the program usage level to an external feedback evaluation system at a second network location, wherein the external feedback evaluation system is configured to associate the program usage level with the feedback provided by the user and related to the program.

According to yet another embodiment of the disclosure, a computer program product is disclosed to facilitate improved objectivity of feedback for evaluating software programs, the feedback provided by a user. The computer program product comprises a computer-readable storage medium having computer-readable program code embodied therewith. The computer-readable program code is executable by one or more computer processors to retrieve, upon determining an authorization to monitor a user's usage of a predefined program, a predefined evaluation profile specifying one or more parameters for assessing usage of the program. The computer-readable program code is further executable to access usage data associated with the user and the program, and determine, based on the usage data and relative to the one or more parameters of the evaluation profile, a program usage level associated with the user and the program. The computer-readable program code is further executable to transmit the program usage level to an external feedback evaluation system, wherein the external feedback system is configured to associate the program usage level with the feedback provided by the user and related to the program.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

FIG. 7 illustrates a comparison of composite scores based on program usage levels and user-provided feedback from different users, according to one or more embodiments disclosed herein.

DETAILED DESCRIPTION

Users' evaluation of a software program can be useful for improving the performance of the software program in successive iterations. For example, the information provided within the evaluation can be used to identify and correct errors or other performance issues that are experienced by users. Additionally, the users' evaluation may be useful to identify features or functionality that users would like to be included in the software program. The information from users' evaluation can be received through any number of means, whether formalized or informal, direct or indirect, and so forth. Some non-limiting examples of channels for receiving evaluation information include dedicated forums for users of the software program (which may be considered a direct means of evaluation, whether formal or informal), as well as comments made by users through social media (which may be an indirect and informal means of evaluation).

However, it may be challenging to understand the relevance of the feedback, and to determine its relative importance for improving the quality of the software program. In one example, receiving a rating or other information related to a particular feature or functionality of the software program could be determined to have less relevance and/or less importance if received from a new user, when compared with being received from a long-time user of the software program. In another example, receiving a rating or other information related to the particular feature or functionality could have less relevance and/or less importance if received from a user less experienced with that feature/functionality, when compared with being received from a more experienced user. Further, while conventional accreditation mechanisms may be sufficient to verify a particular user's identity, the mechanisms are typically unable to provide additional resolution of the relevance or importance of the users' feedback.

Embodiments disclosed herein are directed to techniques for facilitating improved objectivity of feedback for evaluating software programs, where the feedback is provided by a user. The method generally comprises retrieving, at the computing device, and upon determining an authorization to monitor the user's usage of a predefined program, a predefined evaluation profile specifying one or more parameters for assessing usage of the program. The method further comprises accessing usage data associated with the user and the program, and calculating, based on the usage data and relative to the one or more parameters of the evaluation profile, a program usage level associated with the user and the program. The method further comprises transmitting the program usage level from the computing device to an external feedback evaluation system at a second network location, wherein the external feedback evaluation system is configured to associate the program usage level with the feedback provided by the user and related to the program.

Figure 1:
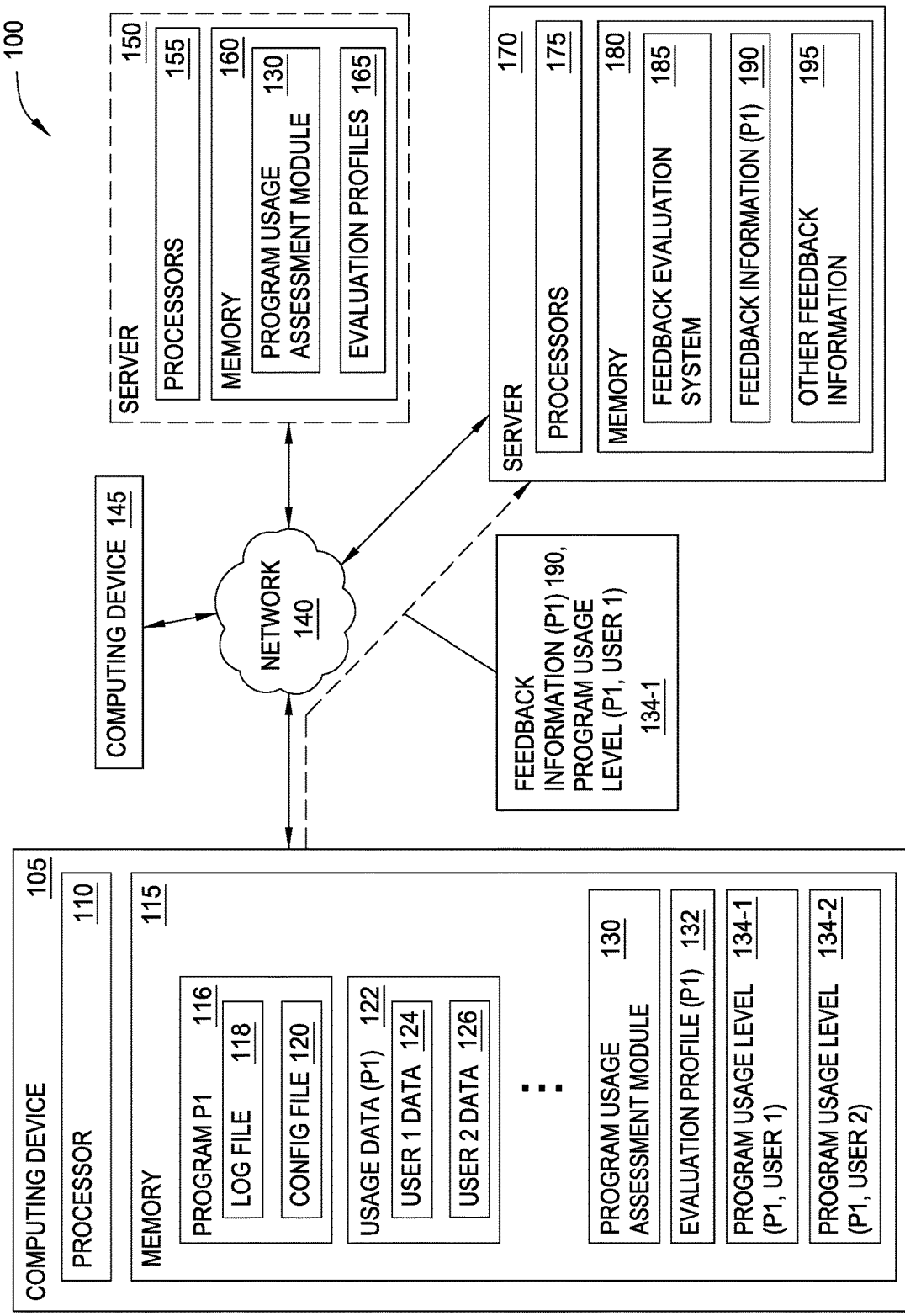
FIG. 1 is a block diagram illustrating a system to facilitate improved objectivity of feedback for evaluating a local software program, according to one or more embodiments disclosed herein.

FIG. 1 is a block diagram illustrating a system 100 to facilitate improved objectivity of feedback for evaluating a local software program, according to one or more embodiments disclosed herein. The system 100 includes a computing device 105 at a first network location, which is communicatively coupled through a network 140 with a computing device 145 and servers 150, 170 that are located at other network locations. Network 140 may include one or more networks of various types, including a local area or local access network (LAN), a general wide area network (WAN), and/or a public network (e.g., the Internet). The computing device 105 may be implemented in any suitable form, some non-limiting examples including personal computer systems, server computer systems, thin or thick clients, handheld, mobile, or laptop devices, multiprocessor systems, microprocessor-based systems, set top boxes, programmable consumer electronics, network PCs, minicomputer systems, mainframe computer systems, and so forth.

The computing device 105 comprises communicatively-coupled processors 110 and memory 115. The processors 110 generally include any processing element capable of performing various functions described herein. While depicted as a single element within the computing device 105, processors 110 are intended to represent a single processor, multiple processors, a processor or processors having multiple cores, as well as combinations thereof. In one embodiment, processors 110 represent a central processing unit (CPU) of the computing device 105. Memory 115 may include a variety of computer-readable media selected for relative performance or other capabilities: volatile and/or non-volatile media, removable and/or non-removable media, etc. Memory 115 may include cache, random access memory (RAM), storage, etc. Memory 115 may include one or more discrete memory modules, such as dynamic RAM (DRAM) dual inline memory modules (DIMMs). Of course, various memory chips, bandwidths, and form factors may alternately be selected. Storage included in memory 115 typically provides a non-volatile memory for the computing device 105, and may include one or more different storage elements such as Flash memory, a hard disk drive, a solid state drive, an optical storage device, and/or a magnetic storage device.

Computing device 105 may be coupled with one or more input devices (not shown) for receiving input from one or more users in the form of feedback information for evaluating software programs. In some embodiments, the one or more input devices can also be used to receive input from users during operation of the software programs. Some well-known and non-limiting examples of input devices for use with a computing device 105 include a keyboard, a mouse, a touchscreen, and so forth. For example, a user may provide textual information related to evaluation of the program through keyboard or touchscreen inputs.

Figure 2:
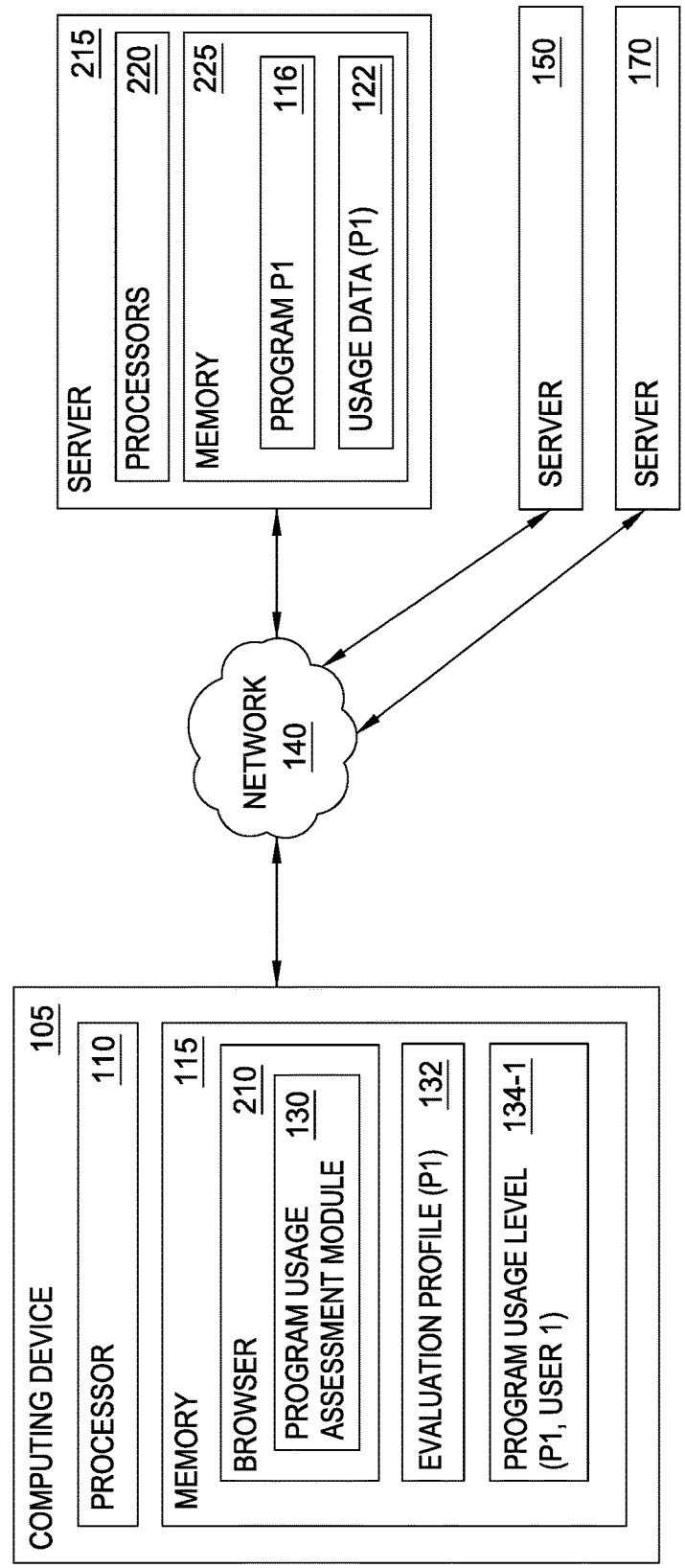
FIG. 2 is a block diagram illustrating a system to facilitate improved objectivity of feedback for evaluating a software program hosted at one or more network locations, according to one or more embodiments disclosed herein.

Program P1 116 represents a predefined software program (or computer application) that is accessible by one or more users through the computing device 105. The program P1 may have any suitable implementation, some non-limiting examples of which include system software, enterprise software, simulation software, content access software, educational software, development software, and entertainment software. In system 100 of FIG. 1, program code of the program P1 is included within the memory 115 of the computing device 105, and is executed by processors 110. In the alternate implementation depicted as system 200 of FIG. 2, the program code of program P1 is included in the memory 225 of a server 215, which is located at a network location that is different than the computing device 105 (i.e., server 215). The usage data (P1) 122 is also maintained in the memory 225. The program P1 is accessed by the processors 110 of the computing device 105 through the network 140. In one embodiment, program P1 is provided as Software as a Service (SaaS) (or "on-demand" software) and is accessed via a web browser 210 executing on the computing device 105.

In some embodiments, during operation the program P1 may generate and/or maintain a log file 118 and/or a configuration file 120. Generally, the log file 118 represents a file of events that are logged by the program P1, such as errors, informational events, and warnings. The configuration file 120 contain configuration settings specific to the program P1. The program P1 may also maintain usage data (P1) 122 including information specific to one or more users' usage of the program P1. As shown, the usage data (P1) 122 is divided into a first user's data (i.e., user 1 data 124), and a second user's data (i.e., user 2 data 126). In some embodiments, the usage data (P1) includes user-related information included within the log file 118 and/or configuration file 120, but this is not a requirement. Further, while a single program P1 has been discussed for simplicity, the memory 115 may include additional programs having associated usage data specific to users of the programs.

Memory 115 further includes a program usage assessment module 130 comprising code which, when executed, operates to generate program usage levels (P1) 134-1, 134-2, etc. that are associated with different users of the program P1 and that are based on the usage data (P1) 122. For example, for a first user the program usage assessment module 130 performs an analysis on the user 1 data 124 according to a predefined evaluation profile (P1) 132 to generate the program usage level (P1, User 1) 134-1 associated with the first user. The evaluation profile (P1) 132 specifies one or more predefined parameters for analyzing a particular user's usage of program P1. In some embodiments, the program usage assessment module 130 determines an authorization to monitor a user's usage of the predefined program P1, and retrieves the evaluation profile (P1) 132 upon receiving such an authorization. The authorization may be requested with any suitable timing, such as during installation of the program usage assessment module 130 on the computing device 105, or during subsequent operation of the program usage assessment module 130. Further, the program usage assessment module 130 may have any suitable form. In some embodiments, the program usage assessment module 130 is a separate application installed on the computing device 105. In other embodiments, and in implementations such as system 200 of FIG. 2, the program usage assessment module 130 is a browser plug-in for the web browser 210 used to access the (SaaS) program P1.

The predefined parameters included within the predefined evaluation profile (P1) 132 may include any type(s) of information within usage data (P1) 122 that is suitable for identifying a user's usage level and/or distinguishing the usage levels of different users. Further, certain ones of the predefined parameters may define different types of values, such as discretized (or tiered) value or numeric values. Still further, values for certain ones of the predefined parameters may be defined relative to a predefined threshold value or values. In some embodiments, the tiers may be separated by threshold values that are adaptively updated from initial threshold values based on historical parameter values.

In some embodiments, the evaluation profile (P1) 132 includes at least a first parameter that is based on a first number of files of a predefined type associated with the program P1. In one non-limiting example, the predefined type is identified by a file extension associated with a file format used by the program P1 (e.g., a ".ppt" file extension is associated with a presentation file for Microsoft Corporation's PowerPoint™ software). In another non-limiting example, the program usage assessment module 130 performs an analysis of files' contents to determine whether the files correspond to the predefined type associated with the program P1. In one embodiment, the first parameter reflects the total number of files of the predefined type. In another embodiment, the first parameter reflects a proportion of files of the predefined type out of a total number of "personal" files that have been saved and/or modified by the user. For example, if a first user has 1,000 personal files stored in the memory 115 of the computing device 105, and 150 of those personal files correspond to the type associated with the program P1, the value of the first parameter for the first user may be 0.15 (that is, 150/1000).

In some embodiments, the evaluation profile (P1) 132 includes at least a second parameter that is based on updates to one or more files that are associated with the program P1. In one embodiment, the second parameter reflects a total number of updates made to the one or more files. In another embodiment, the second parameter reflects an update frequency for the one or more files.

In some embodiments, the evaluation profile (P1) 132 includes at least a third parameter that is based on whether a predefined functionality of the program has been accessed by the user. In some cases, the predefined functionality represents a relatively advanced functionality available within the program P1 that is less likely to be accessed by novice users than by more advanced or experienced users. In one non-limiting example, in the context of a presentation software program such as PowerPoint™, relatively advanced functionality may include embedding or linking objects within the presentation, modifying presentation templates, including transitions or other audiovisual effects to the presentation, and so forth. In one embodiment, the third parameter reflects whether the predefined functionality has been accessed at all. In another embodiment, the third parameter reflects a frequency of accessing the predefined functionality. For example, the third parameter may indicate whether the user has accessed the predefined functionality within a predefined number or percentage of files.

In some embodiments, the evaluation profile (P1) 132 includes at least a fourth parameter that is based on a length of use of the program P1 by the user. In one embodiment, the fourth parameter includes a total amount of time during which the user has used the program P1.

The evaluation profile (P1) 132 may include any of the first, second, third, and fourth parameters discussed above, but other parameters may also be included. Further, greater or fewer parameters and/or different parameters may be included within predefined evaluation profiles associated with predefined programs different than program P1.

As discussed above, the program usage assessment module 130 performs an analysis on usage data (P1) 122 and according to a predefined evaluation profile (P1) 132 in order to generate the program usage level (P1, User 1) 134-1 associated with a first user, and to generate the program usage level (P1, User 2) 134-2 associated with a second user. The program usage levels 134-1, 134-2 may have any suitable formatting. For example, the program usage levels 134-1, 134-2 may include discretized (or tiered) values or numeric values, and may further be defined relative to a predefined threshold value or values. In some embodiments, the program usage levels 134-1, 134-2 are derived from a combination of a plurality of different sub-scores or sub-levels based on the different parameters of the predefined evaluation profile (P1) 132.

In an alternate embodiment, the program usage assessment module 130 is located remotely from the computing device 105. For example, as shown in system 100, the program usage assessment module 130 may be included on a server 150. The server 150 comprises processors 155 and a memory 160 storing the program usage assessment module 130. In some embodiments, the memory 160 may additionally or alternately store a plurality of evaluation profiles 165 corresponding to a plurality of different programs. In one example, the computing device 105 accesses the evaluation profiles 165 from the server 150, and downloads the evaluation profile (P1) 132 after receiving an authorization to monitor the user's usage of the program P1. In another example, the user 1 data 124 is transmitted to the server 150, which determines the program usage level 134-1 and optionally transmits the program usage level 134-1 to the computing device 105 or to server 170.

Server 170 comprises processors 175 and a memory 180 storing an external feedback evaluation system 185 configured to associate or otherwise combine the determined program usage levels 134-1, 134-2, . . . with feedback information (P1) 190 provided by the user(s) and related to the program P1. The feedback information (P1) 190 is generally provided by a user using one or more input devices communicatively coupled with the computing device 105.

The feedback information (P1) 190 may be embodied in any suitable form(s). In some cases, the feedback information (P1) 190 does not have a prescribed format, such as free-form text entered by the user using, e.g., a keyboard or touchscreen. In other cases, the feedback information (P1) 190 has a prescribed format, such as information indicating that a graphical user interface (GUI) element has been pressed or otherwise selected by the user. For example, the GUI element might be a "thumbs-up" or "thumbs-down" icon that indicates a user's approval or disapproval of the software program (or aspects thereof), respectively. Another example of feedback information (P1) 190 having a prescribed format is a survey response with a predefined rating scale (e.g., including selectable values from 1-5).

Further, the feedback information (P1) 190 may be provided by the user through any suitable channels. Some non-limiting examples of channels for receiving evaluation information include dedicated forums for users of the software program (which may be considered a direct means of evaluation, whether formal or informal), as well as comments made by users through social media (which may be an indirect and informal means of evaluation). In some cases, the feedback information (P1) 190 is provided by the user directly from the computing device 105 to the feedback evaluation system 185. For example, and as shown in system 100, the computing device 105 provides feedback information (P1) 190 received from User 1, as well as the program usage level 134-1 associated with User 1, to the server 170. In other cases, the feedback information (P1) 190 is retrieved by the feedback evaluation system 185 from other network locations, such as from an external server hosting a forum site or social media content. In some embodiments, the feedback evaluation system 185 includes tools for locating and/or analyzing the feedback information (P1) 190, such as natural language processing techniques that would be known to the person skilled in the art. For example, from the various information that is provided by a user through a forum site, the analysis performed by the feedback evaluation system 185 may identify feedback information (P1) 190 that relates specifically to the program P1 and distinguish this from other feedback information 195 (i.e., feedback information relating to other programs or otherwise not relevant information).

In some embodiments, the feedback evaluation system 185 is further configured to determine a relevance of the feedback information (P1) 190 based on the program usage levels 134-1, 134-2. The relevance of the feedback information (P1) 190, in turn, helps to determine a relative importance of the feedback information for introducing subsequent changes to the software program. For example, the feedback evaluation system 185 may assign a higher relevance to the feedback information provided by User 1 when User 1's program usage level 134-1 is greater than User 2's program usage level 134-2. Thus, if User 1 provided feedback information indicating that a function of program P1 did not work properly, and User 2 provided feedback information indicating that the same function did work properly, the greater relevance assigned by the feedback evaluation system 185 to User 1's feedback information would likely result in a recommendation that the function be corrected or at least investigated.

Thus, the system 100 as described is configured to receive feedback information from a user, to perform analysis on the feedback information to determine its relevance to a particular program, to access stored information associated with the user and the program, and to transmit results of an automated assessment of the feedback information to a network location that is separate from the computing device associated with the user. In this way, the system 100 relies on multiple computing devices and associated input device (s) to perform the functionality described herein.

Figure 3:
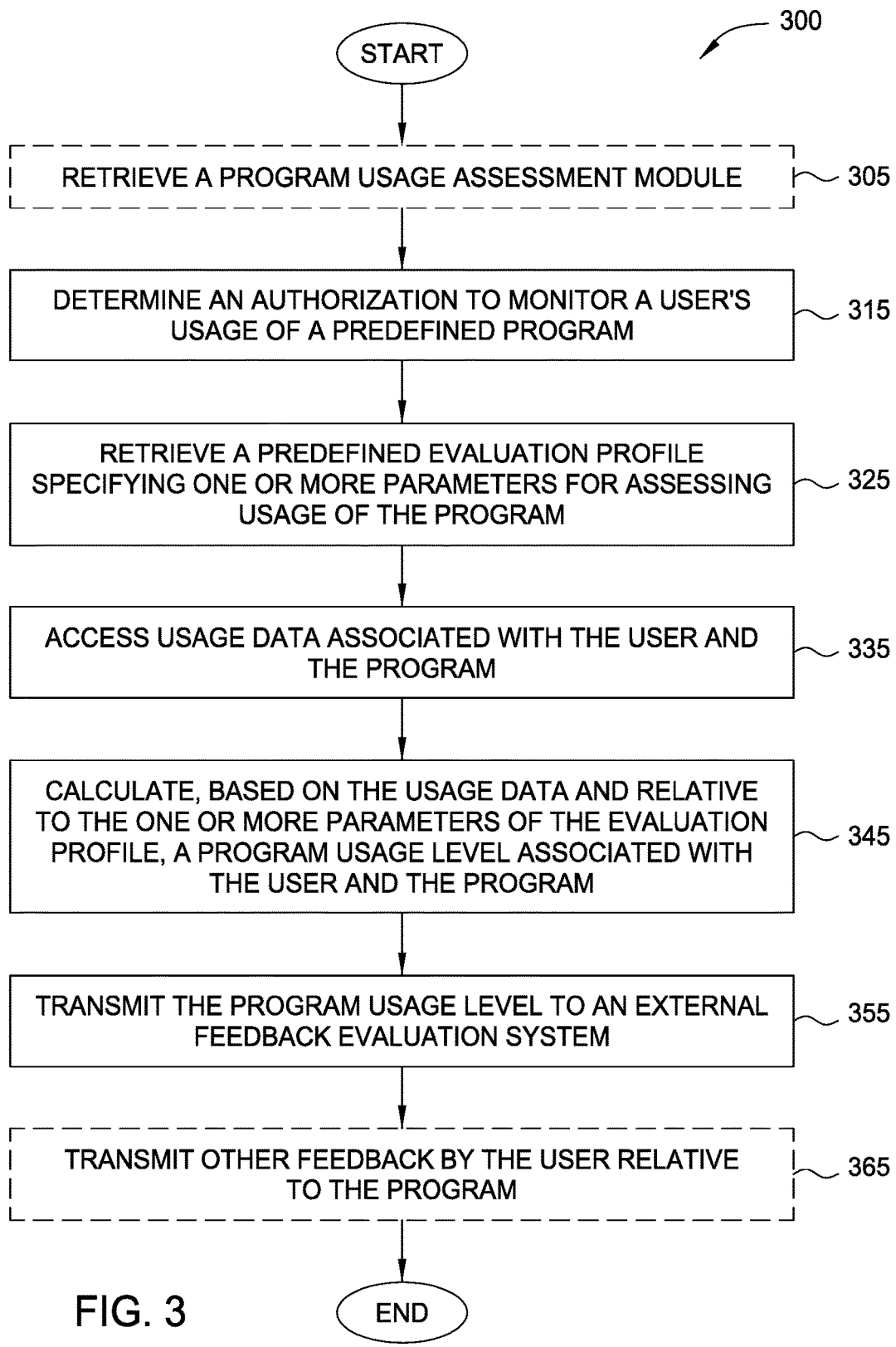
FIG. 3 is a flow chart illustrating a method for facilitating improved objectivity of feedback for evaluating software programs, according to one or more embodiments disclosed herein.

FIG. 3 is a flow chart illustrating a method 300 for facilitating improved objectivity of feedback for evaluating software programs, according to one or more embodiments disclosed herein. Generally, the method 300 is described as being performed in conjunction with a program usage assessment module, such as the program usage assessment module 130 depicted in Figures land 2. Further, the method 300 may be used in conjunction with any of the embodiments discussed herein.

Method 300 begins at optional block 305, where a computing device retrieves a program usage assessment module. In some embodiments, the program usage assessment module may be in the form of a separate application installed on the computing device, or as a browser plug-in for a web browser. At block 315, the program usage assessment module determines an authorization to monitor a user's usage of a predefined program. In some embodiments, the authorization is determined during installation of the program usage assessment module, or during subsequent operation of the program usage assessment module.

At block 325, the program usage assessment module retrieves a predefined evaluation profile specifying one or more parameters for assessing usage of the program. In some embodiments, the program usage assessment module downloads the evaluation profile from a plurality of evaluation profiles stored on an external server. In some embodiments, the evaluation profile includes at least one parameter selected from: a first parameter that is based on a first number of files of a predefined type associated with the program, a second parameter that is based on updates to one or more files that are associated with the program, a third parameter that is based on whether a predefined functionality of the program has been accessed by the user, and a fourth parameter that is based on a length of use of the program by the user.

At block 335, the program usage assessment module accesses usage data associated with the user and the program. In some embodiments, the usage data is stored within the computing device or at a separate network location, such as within an external server that hosts the predefined program. At block 345, the program usage assessment module calculates, based on the usage data and relative to the one or more parameters of the evaluation profile, a program usage level associated with the user and the program. At block 355, the program usage assessment module transmits the program usage level to an external feedback evaluation system. The feedback evaluation system associates or otherwise combines the program usage level with the feedback information provided by the user and related to the program.

At optional block 365, the computing device transmits other feedback by the user relative to the program. Method 300 ends following completion of block 355 or block 365.

Figure 4:
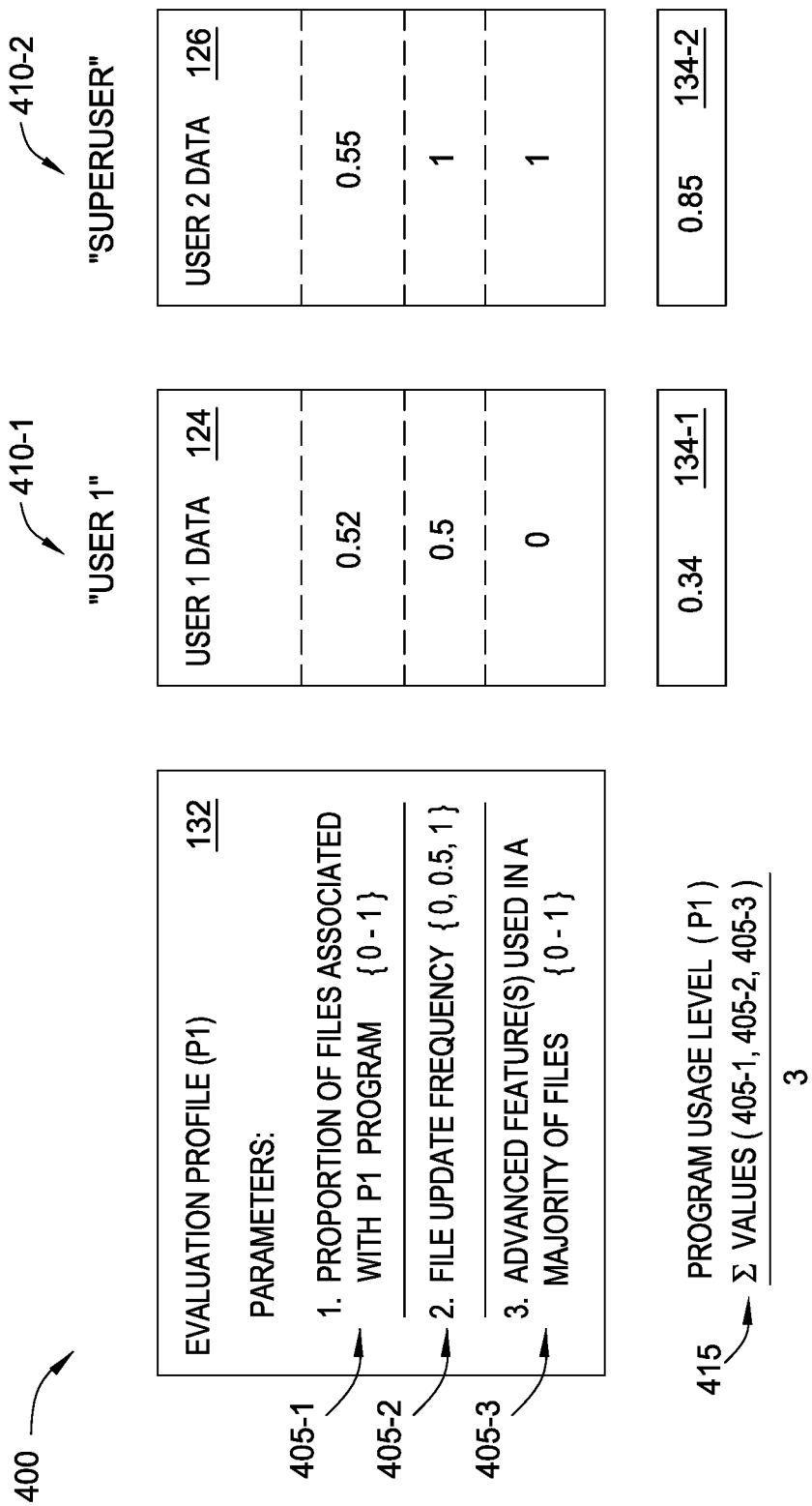
FIG. 4 illustrates a calculation of exemplary program usage levels for a plurality of users, according to one or more embodiments disclosed herein.

FIG. 4 illustrates a calculation of exemplary program usage levels for a plurality of users, according to one or more embodiments disclosed herein. The diagram 400 depicts an example evaluation profile (P1) 132, stored usage data for two different users 410-1, 410-2, and the resulting program usage levels 134-1, 134-2.

As shown, evaluation profile (P1) 132 includes three parameters: parameter 405-1 reflecting a proportion of files associated with the program P1 having numeric values between 0 and 1, parameter 405-2 reflecting a file update frequency and having discretized values of 0, 0.5, and 1, and parameter 405-3 reflecting whether advanced features were used within a majority of the files and having discretized values of 0 and 1. As discussed above, other combinations of parameters are possible.

User 1 data 124 stored for a first user 410-1 (having an associated username "user1") includes a value of 0.52 for the parameter 405-1, a value of 0.5 for the parameter 405-2, and a value of 0 for the parameter 405-3. User 2 data 126 stored for a second user 410-2 (having an associated username "superuser") includes a value of 0.55 for the parameter 405-1, a value of 1 for the parameter 405-2, and a value of 1 for the parameter 405-3.

In one non-limiting example, the program usage assessment module calculates program usage levels (P1) 134-1, 134-2 according to an equation 415, in which the program usage level for a user equals the sum of the values corresponding to parameters 405-1, 405-2, 405-3, divided by 3. Applying equation 415 to the values associated with parameters 405-1, 405-2, 405-3 produces normalized program usage levels (P1) 134-1, 134-2, although this is not a requirement. Indeed, equation 415 may have any suitable alternate form, such as a sum of weighted values, including other mathematical and/or logical functions, and so forth. Applying the equation 415 to the User 1 data 124 and the User 2 data 126, the program usage level (P1) 134-1 for the first user 410-1 is calculated as 0.34, and the program usage level (P1) 134-2 for the second user 410-2 is calculated as 0.85.

Figures 5, 6:
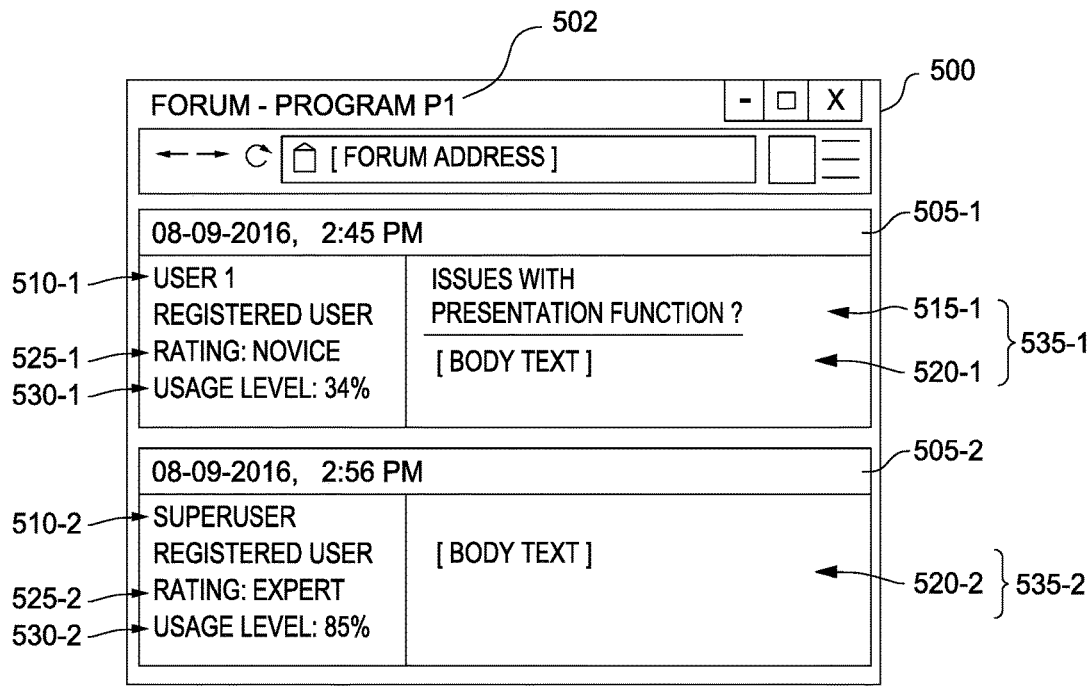
FIG. 5 illustrates an exemplary browser window displaying a program usage level and user-provided feedback information within a forum page, according to one or more embodiments disclosed herein.
FIG. 6 illustrates a calculation of an exemplary composite score based on a program usage score and user-provided feedback information, according to one or more embodiments disclosed herein.

FIG. 5 illustrates an exemplary browser window displaying a program usage level and user-provided feedback information within a forum page, according to one or more embodiments disclosed herein.

Browser window 500 includes a title 502 ("Forum—Program P1") and two forum posts 505-1, 505-2. A first user (identified by username 510-1 "user1") posted the forum post 505-1 as the original post of the thread or topic, and a second user (identified by username 510-2 "superuser") posted the forum post 505-2 within the thread. Forum post 505-1 includes a title 515-1 of the thread, a body 520-1 including textual input, and additional information for the first user such as a rating 525-1 and a usage level 530-1. Forum post 505-2 includes a body 420-2, a rating 525-2 for the second user, and a usage level 530-2. Generally, the usage levels 530-1, 530-2 are meant to display the calculated program usage levels for the different users within program P1 (i.e., program usage levels 134-1, 134-2 discussed above), although this is not a requirement. Further, the ratings 525-1, 525-2 may represent a qualitative rating corresponding to the usage levels 530-1, 530-2, but this is also not a requirement.

Together, the title 515-1 and the body 520-1 comprise first feedback information 535-1 provided by the first user (i.e., "user1"). Forum post 505-2 includes a body 420-2, which comprises second feedback information 435-2 provided by the second user (i.e., "superuser").

In some embodiments, an external feedback evaluation system is configured to identify, from the feedback information 535-1, 535-2, which information relates to the predefined program P1. In some cases, the feedback evaluation system generally assumes that the feedback information 535-1, 535-2 relates to program P1 based on the title 502 of the browser window 500 and/or the title 515-1 of the thread. In other cases, the feedback evaluation system performs analysis of the contents of the feedback information 535-1, 535-2 to determine whether the information relates to the program P1. Thus, the external feedback evaluation system may thus determine from the contents of the browser window 500 the feedback information relating to program P1 provided by different users, as well as the relative usage levels of those users. The external feedback evaluation system may further associate or combine the determined feedback with the relative usage levels to determine a relevance of the feedback information. In other embodiments, however, the external feedback evaluation system communicates directly with a program usage assessment module to determine the program usage levels, and does not require the usage levels 530-1, 530-2 to be indicated within the forum posts 505-1, 505-2.

FIG. 6 illustrates a calculation of an exemplary composite score based on a program usage score and user-provided feedback information, according to one or more embodiments disclosed herein. Chart 600 generally illustrates the operation of an exemplary external feedback evaluation system for feedback information received from a first user (such as the user "superuser" discussed in FIGS. 4, 5).

Chart 600 includes categories 605, the program usage level 134-2, feedback relevance values 610, and composite scores 615. Based on the feedback information received by the first user related to a software program P1, such as the feedback information 535-2 included in forum post 505-2, the external feedback evaluation system determines which aspects of program P1 the feedback information addresses. In some embodiments, the external feedback evaluation system calculates a feedback relevance value 610 for each entry under category 605, where one or more highest feedback relevance values 610 indicate a higher likelihood that the feedback information is directed to the corresponding entry. For example, entry 605-1 relates to a first function F1 of the program P1, entry 605-2 relates to a second function F2 of the program P1, and entry 605-3 relates to a third function F3 of the program P1. Based on its analysis of the feedback information, the external feedback evaluation system calculates feedback relevance values 610 of 0.90 for function F1, 0.20 for function F2, and 0.50 for function F3, indicating that it is most likely that the user's feedback information is directed to function F1.

To provide a more objective measure of the feedback information provided by the first user, the external feedback evaluation system determines a relevance of the feedback information. To determine the feedback information's relevance, the external feedback evaluation system multiplies the program usage level 134-2 associated with the first user by the feedback relevance values 610 to produce composite scores 615: 0.765 for function F1, 0.170 for function F2, and 0.425 for function F3. These composite scores 615 may then be compared with other composite scores for other users' feedback information to determine the relative importance of the different users' feedback information for introducing subsequent changes to the software program. One non-limiting example is shown in chart 700 of FIG. 7, where the feedback information provided by the user "superuser" related to function F1 has a composite score of 0.765, while the feedback information provided by the user "user1" related to the same function F1 has a lower composite score of 0.450. In this way, the feedback information provided by the user "superuser" will carry greater weight than that of the user "user1" when considering whether to update the software program, and/or which changes to make within the software program.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a deep question answering system or related data available in the cloud. For example, the deep question answering system could execute on a computing system in the cloud and provide question classification and feature mapping. In such a case, the deep question answering system could classify questions, map features and store the resultant data sets at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for facilitating improved objectivity of feedback for evaluating software programs, the feedback provided by a user associated with a computing device at a first network location, the method comprising:
   upon determining an authorization to monitor usage of a predefined program by the user:
      retrieving, at the computing device, a predefined evaluation profile specifying a plurality of parameters for assessing usage of the program, wherein the plurality of parameters comprises a first parameter that is based on whether one or more predefined advanced functions of a plurality of functions accessible within the program has been accessed by the user, wherein the first parameter indicates whether the one or more advanced functions have been used within a majority of one or more files associated with the program;
   accessing usage data associated with the user and the program;
   calculating, based on the usage data and relative to the plurality of parameters of the evaluation profile, a program usage level describing an experience level of the user with the program, wherein accessing the advanced function corresponds to a greater program usage level relative to having not accessed the advanced function, and wherein calculating the program usage level comprises calculating a weighted sum of values corresponding to the plurality of parameters;
   receiving the feedback provided by the user at a graphical user interface displayed by the computing device; and
   transmitting the feedback and the program usage level from the computing device to an external feedback evaluation system at a second network location, wherein the external feedback evaluation system is configured to associate the program usage level with the feedback provided by the user and related to the program.

2. The computer-implemented method of claim 1, wherein the predefined program is hosted at one or more third network locations and accessible by a browser program executing on the computing device.

3. The computer-implemented method of claim 1, wherein accessing usage data comprises accessing a log file or a configuration file associated with the predefined program.

4. The computer-implemented method of claim 1, wherein the plurality of parameters of the predefined evaluation profile further comprise at least one of:
   a second parameter based on a first number of files of a predefined type associated with the predefined program;
   a third parameter based on updates to the one or more files associated with the predefined program; and
   a fourth parameter based on a length of use of the predefined program by the user.

5. The computer-implemented method of claim 4, wherein the third parameter comprises a frequency of updates to the one or more files, and wherein calculating the program usage level comprises comparing the frequency with one or more predetermined frequency threshold values to produce a update frequency subscore.

6. A system to facilitate improved objectivity of feedback for evaluating software programs, the feedback provided by a user, the system comprising:
   a computing device at a first network location and associated with the user, the computing device comprising one or more computer processors and configured to:
      retrieve, upon determining an authorization to monitor the user's usage of a predefined program, a predefined evaluation profile specifying a plurality of parameters for assessing usage of the program, wherein the plurality of parameters comprises a first parameter that is based on whether one or more predefined advanced functions of a plurality of functions accessible within the program has been accessed by the user, wherein the first parameter indicates whether the one or more advanced functions have been used within a majority of one or more files associated with the program;
      access usage data associated with the user and the program;
      calculate, based on the usage data and relative to the plurality of parameters of the evaluation profile, a program usage level describing an experience level of the user with the program, wherein accessing the advanced function corresponds to a greater program usage level relative to having not accessed the advanced function, and wherein calculating a program usage level comprises calculating a weighted sum of values corresponding to the plurality of parameters;
      display a graphical user interface;
      receive the feedback provided by the user at the graphical user interface; and
      transmit the feedback and the program usage level to an external feedback evaluation system at a second network location, wherein the external feedback evaluation system is configured to associate the program usage level with the feedback provided by the user and related to the program.

7. The system of claim 6, wherein the predefined program is hosted at one or more third network locations and accessible by a browser program executing on the computing device.

8. The system of claim 6, wherein accessing usage data comprises accessing a log file or a configuration file associated with the predefined program.

9. The system of claim 6, wherein the plurality of parameters of the predefined evaluation profile further comprise at least one of:
   a second parameter based on a first number of files of a predefined type associated with the predefined program;
   a third parameter based on updates to the one or more files associated with the predefined program; and
   a fourth parameter based on a length of use of the predefined program by the user.

10. The system of claim 9, wherein the third parameter comprises a frequency of updates to the one or more files, and wherein calculating the program usage level comprises comparing the frequency with one or more predetermined frequency threshold values to produce a update frequency subscore.

11. A computer program product to facilitate improved objectivity of feedback for evaluating software programs, the feedback provided by a user, the computer program product comprising:
   a computer-readable storage medium having computer-readable program code embodied therewith, the computer-readable program code executable by one or more computer processors to:
      retrieve, upon determining an authorization to monitor a user's usage of a predefined program, a predefined evaluation profile specifying a plurality of parameters for assessing usage of the program, wherein the plurality of parameters comprises a first parameter that is based on whether one or more predefined advanced functions of a plurality of functions accessible within the program has been accessed by the user, wherein the first parameter indicates whether the one or more advanced functions have been used within a majority of one or more files associated with the program;
      access usage data associated with the user and the program;
      determine, based on the usage data and relative to the plurality of parameters of the evaluation profile, a program usage level describing an experience level of the user with the program, wherein accessing the advanced function corresponds to a greater program usage level relative to having not accessed the advanced function, and wherein determining a program usage level comprises calculating a weighted sum of values corresponding to the plurality of parameters; and
      transmit the feedback and the program usage level to an external feedback evaluation system, wherein the external feedback system is configured to associate the program usage level with the feedback provided by the user and related to the program.

12. The computer program product of claim 11, wherein the one or more processors are located at a first network location, and wherein the predefined program is hosted at one or more second network locations and accessible by a browser program executing on the one or more processors.

13. The computer program product of claim 11, wherein accessing usage data comprises accessing a log file or a configuration file associated with the predefined program.

14. The computer program product of claim 11, wherein the plurality of parameters of the predefined evaluation profile further comprise at least one of:
   a second parameter based on a first number of files of a predefined type associated with the predefined program;
   a third parameter based on updates to the one or more files associated with the predefined program; and
   a fourth parameter based on a length of use of the predefined program by the user.

15. The computer program product of claim 14, wherein the third parameter comprises a frequency of updates to the one or more files, and wherein calculating the program usage level comprises comparing the frequency with one or more predetermined frequency threshold values to produce a update frequency subscore.

16. The computer-implemented method of claim 4, wherein the plurality of parameters of the predefined evaluation profile comprise at least two of the second parameter, the third parameter, and the fourth parameter.

17. The computer-implemented method of claim 1, wherein the program usage level comprises a normalized program usage level.

18. The computer-implemented method of claim 1, further comprising:
   determining a feedback relevance value associated with the feedback; and
   determining a composite score based on the program usage level and the feedback relevance value.

19. The computer-implemented method of claim 18, wherein determining the composite score comprises:
   determining a respective composite score for each of a plurality of predefined functions of the predefined program.

20. The computer-implemented method of claim 18, further comprising:
   comparing the composite score with a second composite score associated with second feedback provided by a second user.

* * * * *